United States Patent [19]

Rudolph

[11] 3,823,277

[45] July 9, 1974

[54] TELEPHONE LOCKING DEVICE

[75] Inventor: Dietmar H. Rudolph, Queens, N.Y.

[73] Assignee: The Raymond Lee Organization, Inc., New York, N.Y. ; a part interest

[22] Filed: Oct. 24, 1972

[21] Appl. No.: 299,777

[52] U.S. Cl. .............................................. 179/189 R
[51] Int. Cl. .............................................. H04m 1/66
[58] Field of Search .................................. 179/189 R

[56] References Cited

UNITED STATES PATENTS 3,624,317 11/1971 Buckingham et al. .......... 179/189 R

*Primary Examiner*—Thomas W. Brown
*Attorney, Agent, or Firm*—Howard I. Podell

[57] ABSTRACT

A device for locking a telephone to prevent its use for both incoming and outgoing telephone calls by clamping the telephone plunger switch button in the down and OFF position. The device consists of two parts slidably fitted together, which are shaped so as to fit about the shelf of the telephone and the telephone switch button. A hole in one of the parts is of a size to admit a conventional telephone dial-type lock, which when so inserted, prevents the parts from sliding together to the position required for removal from an attached telephone.

1 Claim, 4 Drawing Figures

TELEPHONE LOCKING DEVICE

SUMMARY OF THE INVENTION

This invention relates to a device for locking a conventional desk telephone so that it cannot be employed for either incoming or outgoing telephone calls.

An advantage of this device is that it employs a conventional lock, normally used to prevent the use of the telephone dial. However such a lock, when fastened to a telephone dial, does not prevent the use of the telephone by unauthorized individuals for the receipt of incoming collect calls, nor can the conventional lock be employed on the newer push button type of telephones. However, when combined with this invention, the conventional lock may be used on both dial type and pushbutton type telephones and the locked assembly renders the telephone inoperative to unauthorized users for both incoming and outgoing calls.

The device consists of a first member which is shaped with a groove to fit about the top shelf of the telephone located between the two plunger switch buttons that activate the telephone switch. When the first member is slipped from the back of the telephone over the telephone shelf, it may then be slid sideways to also cover a plunger switch button, maintaining the telephone switch in the OFF position. The first member contains a through channel through which a second member is shaped to slip. With both members assembled together, and the first member fastened to the telephone shelf and over the plunger switch arm, the second member may be slid in the first member sideways, so as to reach the side wall of the telephone shelf, said sidewall being on the side of the telephone opposite from the plunger arm contacted by the first member. In this position, a hole is exposed in the second member of the size to accept the conventional dial type telephone lock cylinder. Once the said lock is inserted into the hole of the second member, neither of the members may slide laterally with respect to each other, nor with respect to the telephone and the device may not be removed from the telephone.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
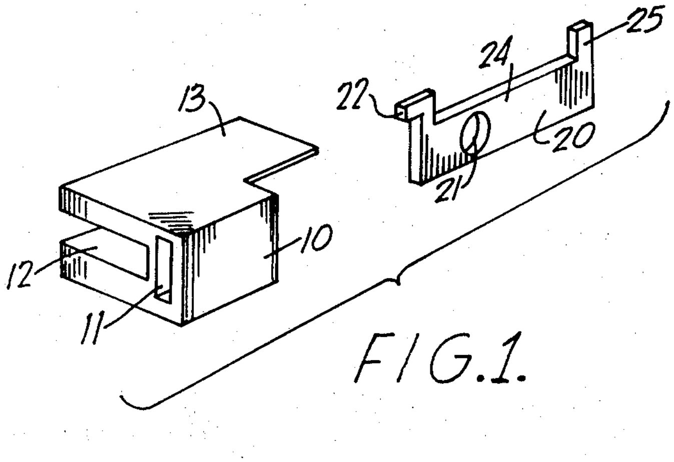
FIG. 1 is an exploded perspective view of the two members that make up the assembly of the device.
Figure 2:
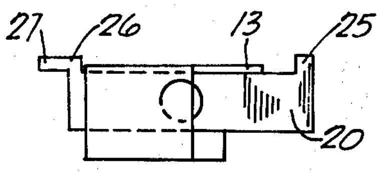
FIG. 2 is a side view of the two members assembled together.

Turning now descriptively to the drawings, in which similar reference characters denote similar elements throughout the several views, FIG. 1 illustrates the two members which make up the locking assembly, latch member 10 and slider member 20, with FIG. 2 illustrating the two parts assembled together in the normal mode prior to use. Latch member 10 is fitted with a through channel 11 which is of similar rectangular cross-section to the cross-section of the mid-section 24 of slider member 20. Channel 11 permits the mid-section 24 of slider member 20 to freely slide transversely in channel 11. Slider member 20 may not be removed from channel 11 of latch member 10, once fabricated, since slider member 20 is fitted with a protruding ear 25 at one end and a protruding ear 26 at the other end of mid-section 24, both ears 25 and 26 acting as stops to limit the full sliding travel of slider member 20 in channel 11 of latch member 10.

Figure 3:
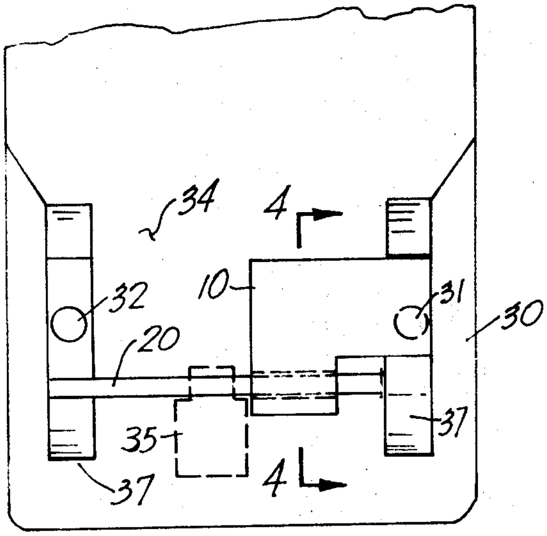
FIG. 3 is a partial plan view of a desk telephone to which the assembly has been mounted, in the locked position.
Figure 4:
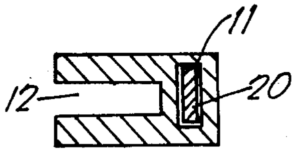
FIG. 4 is an end view of the members assembled together.

As shown in FIG. 1 and FIG. 3 latch member 10 is fitted with a deep groove 12 which is of a size to fit over the shelf 34 on the telephone between the plunger switch button 32 and plunger switch arm 31, with both plunger switch buttons 31 and 32 being mechanically coupled together. Plunger switch buttons 31 and 32 are conventionally spring-mounted so that when the weight of the telephone handset is removed from the plunger switch buttons, they push upwards to switch the telephone to the ON mode. With either plunger switch buttons 31 or 32 pressed in the down position, and by either the weight of a telephone handset, or by pressure applied by latch member 10, the telephone switch is retained in the OFF mode.

A lip 13 extends laterally as a continuation of the top section of latch member 10, such that when the groove 12 of latch member 10 is slid over the shelf 34 of the telephone, from the back of the telephone, and then latch member 10 is slid laterally on the shelf 34 in the direction of latch lip 13, the latch lip 13 will contact a plunger button 31. If plunger arm 32 is momentarily manually depressed, the lip 13 of latch member 10 can then slide over the top of depressed plunger button 31 and retain plunger button 31 in the depressed condition as shown in FIG. 3. In order for latch member 10 to slide laterally, once the groove 12 of latch member 10 is fully engaged with the shelf 34 of the telephone, slider member 20 must slide freely with respect to latch member 10 and in channel 11 of latch member 10, since the ends of slider member 20 engage the inner surfaces of both telephone posts 37, with lip 27 which protrudes horizontally from end ear 26 of the slider member 20 fitting in front of the upright of post 37.

Once the device has been installed, with latch member 10 in place depressing the plunger switch button 31, a conventional cylindrical telephone dial lock 35 is inserted in the exposed hole 21 of slider member 20. Hole 21 is of the same diameter as the hole of a telephone dial. Lock 35 prevents sliding action of latch member 10 relative to slider member 20 or relative to desk telephone 30 and prevents removal of the device from the telephone, since such transverse sliding action is necessary for removal of the device in the installed position. The engagement of groove 12 of latch member 10 with telephone shelf 34 prevents vertical movement of the assembly, with respect to the telephone 30, and also prevents movement of the device further towards the forward end of the telephone. Lip 27 of ear 26 of the slider member 20 fits forward of the upright of vertical telephone post 37 preventing the movement of the assembled device backwards from the telephone, and the length of the slider member 20 is such that it fits just between the telephone post arms 37 preventing lateral motion of the installed slider member 20 with respect to the telephone 30.

The assembled device may only be removed from the telephone by removal of lock 35 from hole 21 of the slider member 20, so as to permit moving the latch member laterally away from the depressed plunger switch button 31. Once the latch member 10 has been disengaged from the plunger switch button 31, the telephone is operative, and the device may be left on the telephone in this position, or readily removed, as desired.

It is to be noted, that in the foregoing description, terms of orientation and direction are stated with regard to the position of a conventional desk type telephone, the base of which is resting on a horizontal surface.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A device for locking a desk telephone to prevent its use for both incoming and outgoing telephone calls by maintaining the telephone plunger switch button in a depressed condition, said device consisting of a latch member which is fitted with a groove so as to permit the latch member to slide about the horizontal shelf on the telephone between the two plunger switch buttons, with the shelf restricting the vertical movement of the latch member when said groove engages the horizontal shelf, said latch member being fitted with a projection on its upper surface on one lateral side, said projection being adaptable to cover the depressed plunger switch button on one side of the telephone, when the latch member is slid transversely on the telephone shelf in the direction of said projection, said latch member being fitted with a through channel or retaining a slider member designed to cooperate with the latch member in such a way as to retain the device on the telephone, the mid-section of the slider member being of a cross-section to slidably fit through said channel in the latch member, the slider member being fitted with end stops to limit the travel of the slider member in the latch member and to prevent the disengagement of the slider member from the latch member, the side of said slider member being fitted with a hole of a size to accommodate a conventional telephone dial lock, said hole located such that the insertion of the telephone dial lock in the hole in the side of the slider member prevents sliding motion of the slider member relative to the latch member towards the latch member past the lock and hole, so that the slider member prevents lateral motion of the latch member relative to the telephone and the telephone plunger switch button in a direction away from the button when the device is installed on a telephone and a telephone dial lock is assembled in the hole of the slider member, said slider member being of a length to fit between the two telephone posts located on each end of the telephone shelf so as to prevent lateral movement of the assembled device in the installed locked position, and said slider member being fitted with a projection on the upper end of the slider member which is opposite from the end of the slider member adjacent to the telephone post covered by the latch member in the locked position, said projection extending laterally from the upper end of the slider member, in the locked position over the section between the telephone posts opposite said above-mentioned post and in front of the rearmost one of the said opposite telephone posts, so that said projection on the slider member and the projection on the latch member, in the locked and assembled position, prevent backwards movement of the device off the telephone shelf past the rear uprights of the telephone posts.

* * * * *